(12) United States Patent
Kuehnel et al.

(10) Patent No.: US 10,419,317 B2
(45) Date of Patent: Sep. 17, 2019

(54) IDENTIFYING AND TARGETING DEVICES BASED ON NETWORK SERVICE SUBSCRIPTIONS

(71) Applicant: Microsoft Technology Licensing, LLC, Redmond, WA (US)

(72) Inventors: Thomas Kuehnel, Seattle, WA (US); Calvin Choe, Redmond, WA (US); Sidharth Nabar, Seattle, WA (US); James Gray, Redmond, WA (US); Rao Salapaka, Sammamish, WA (US); Nick Banks, Duvall, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 279 days.

(21) Appl. No.: 14/484,115

(22) Filed: Sep. 11, 2014

(65) Prior Publication Data

US 2015/0081860 A1    Mar. 19, 2015

Related U.S. Application Data

(60) Provisional application No. 61/878,463, filed on Sep. 16, 2013.

(51) Int. Cl.
*H04L 12/26* (2006.01)
*H04L 12/24* (2006.01)
(Continued)

(52) U.S. Cl.
CPC ........ *H04L 43/0876* (2013.01); *G06F 21/316* (2013.01); *G06F 21/35* (2013.01);
(Continued)

(58) Field of Classification Search
CPC ............... H04L 63/0876; H04L 43/0876; H04L 67/26; H04L 67/18; H04L 67/22;
(Continued)

(56) References Cited

U.S. PATENT DOCUMENTS

| 7,603,119 | B1 | 10/2009 | Durig et al. |
| 8,259,613 | B2 * | 9/2012 | Cromer ............... H04L 12/2898 370/254 |

(Continued)

FOREIGN PATENT DOCUMENTS

| CN | 1658557 A | 8/2005 |
| EP | 1566942 A2 | 8/2005 |
| RU | 2449476 C2 | 4/2012 |

OTHER PUBLICATIONS

Churchill, Sam, "Cellular/WiFi Roaming Gets Real", Published on: Jun. 26, 2012, Available at: http://www.dailywireless.org/2012/06/26/cellularwifi-roaming-gets-real/, 8 pages.

(Continued)

*Primary Examiner* — Chris Parry
*Assistant Examiner* — Abderrahmen Chouat

(57) ABSTRACT

Examples of the disclosure describe automatically associating devices of a user with a network service subscription of the user. The user has a subscription to services offered by an entity. Connection statistics for the devices to networks are generated and compared to criteria to determine whether any of the devices should be associated with the subscription of the user. After association, the devices are able to access networks and/or services associated with the subscription.

20 Claims, 8 Drawing Sheets

(51) Int. Cl.
*H04L 29/08* (2006.01)
*G06F 21/31* (2013.01)
*H04W 8/18* (2009.01)
*G06Q 30/02* (2012.01)
*G06F 21/35* (2013.01)

(52) U.S. Cl.
CPC ..... *G06Q 30/0254* (2013.01); *H04L 41/0806* (2013.01); *H04L 67/18* (2013.01); *H04L 67/22* (2013.01); *H04L 67/26* (2013.01); *H04W 8/18* (2013.01)

(58) Field of Classification Search
CPC ........... H04L 29/08675; H04L 41/0893; H04L 41/5054; H04L 41/509; H04L 63/10; H04L 63/1408; H04L 43/04; H04L 67/306; H04L 63/102; H04L 12/2856; H04L 12/2898; H04L 51/32; H04L 63/08; H04L 63/0892; H04L 63/162; H04L 65/1006; H04L 65/1016; H04L 65/1069; H04L 65/1073; H04L 65/1076; H04L 67/16; H04L 67/28; H04L 67/303; G06Q 30/0269; G06Q 30/0241; G06Q 30/0277; G06Q 30/02; G06Q 30/0254; G06Q 50/01; G06Q 30/0251; G06Q 30/0261; H04W 8/18; H04W 4/26; H04W 48/16; H04W 84/12; H04W 88/08; H04W 12/04; H04W 12/06; H04W 12/08; H04W 24/04; H04W 36/26; H04W 48/02; H04W 48/06; H04W 48/10; H04W 48/14; H04W 4/00; H04W 4/029; H04W 76/18; H04W 84/04; H04W 88/02; G06F 21/316; G06F 21/44; H04N 21/2543; H04N 21/26613; H04N 21/41407; H04N 21/43615
USPC ........ 709/224, 229, 225, 220; 370/252, 401; 705/14.66, 14.49, 14.53
See application file for complete search history.

(56) References Cited

U.S. PATENT DOCUMENTS

| | | | | |
|---|---|---|---|---|
| 8,806,041 | B1* | 8/2014 | Lopez Suarez | H04L 63/102 709/227 |
| 2004/0203890 | A1* | 10/2004 | Karaoguz | H04W 48/16 455/456.1 |
| 2007/0240202 | A1 | 10/2007 | Sullivan et al. | |
| 2007/0283268 | A1 | 12/2007 | Berger et al. | |
| 2009/0109941 | A1 | 4/2009 | Carter | |
| 2009/0165083 | A1 | 6/2009 | Mclean et al. | |
| 2010/0211996 | A1 | 8/2010 | McGeehan et al. | |
| 2012/0303831 | A1* | 11/2012 | Toshniwal | H04L 65/1016 709/229 |
| 2012/0323686 | A1* | 12/2012 | Burger | G06F 21/316 705/14.55 |
| 2013/0007853 | A1 | 1/2013 | Gupta et al. | |
| 2013/0100857 | A1 | 4/2013 | Iyer | |
| 2013/0210379 | A1 | 8/2013 | Cloutier | |
| 2014/0082050 | A1* | 3/2014 | Chud | H04L 67/10 709/203 |
| 2014/0123232 | A1* | 5/2014 | Kuscher | H04W 12/08 726/4 |
| 2015/0043528 | A1* | 2/2015 | Salkintzis | H04W 4/028 370/331 |
| 2016/0027042 | A1* | 1/2016 | Heeter | G06Q 30/018 705/14.47 |
| 2017/0223396 | A1* | 8/2017 | Brown | H04N 21/234309 |

OTHER PUBLICATIONS

K, Rajesh, "Wi-Fi Certified Passpoint: Why is it Required for Hotspots?", Published on: May 24, 2013, Available at: http://www.excitingip.com/3722/wi-fi-certified-passpoint-why-is-it-required-for-hotspots/, 3 pages.
"International Preliminary Report on Patentability Issued in PCT Application No. PCT/US2014/055534", dated Jul. 30, 2015, 7 Pages.
"International Search Report and Written Opinion Issued in PCT Patent Application No. PCT/US2014/055534", dated Mar. 19, 2015, 20 pages.
Bellovin, Steven M. "A Technique for Counting NATted Hosts", In Proceedings of the 2nd ACM SIGCOMM Workshop on Internet Measurment, Nov. 6, 2002, pp. 267-272.
"HotSpot.de", Published on: Sep. 10, 2013 Available At: http://www.hotspot.de/content/funktion.html, 2 pages.
"Office Action Issued in Australian Patent Application No. 2014318468", dated Mar. 28, 2018, 3 Pages.
Office Action Issued in Russian Patent Application No. 2016109169 dated Jun. 20, 2016, 2 Pages. (W/o English Translation).
"Office Action Issued in Australian Patent Application No. 2014318468", dated May 29, 2018, 2 Pages.
"First Office Action and Search Report Issued in Chinese Patent Application No. 201480051114.7", dated May 30, 2018, 13 Pages.
"Office Action Issued in Russian Patent Application No. 2016109169", dated Jun. 20, 2018, 6 Pages. (w/o English Translation).
"Second Office Action Issued in Chinese Patent Application No. 201480051114.7", dated Feb. 19, 2019, 7 Pages.

* cited by examiner

US 10,419,317 B2

IDENTIFYING AND TARGETING DEVICES BASED ON NETWORK SERVICE SUBSCRIPTIONS

CROSS-REFERENCE TO RELATED APPLICATION

This application claims the benefit of U.S. Provisional Application No. 61/878,463, filed Sep. 16, 2013, the entirety of which is hereby incorporated by reference herein.

BACKGROUND

Entities such as Internet Service Providers (ISP) increasingly offer services beyond providing Internet access to the home. Those services include, for example, access to public Wi-Fi hotspots, offers, and coupons. As the quantity of Internet-connected devices carried by users increases, associating those devices with subscriptions of the user, without requiring the user to manually associate the device to the ISP, becomes a challenge. Such a manual requirement often includes entering credentials that the user may not remember or be aware of. This takes away from the time the user could be taking advantage of such a service, and generally degrades the user experience.

SUMMARY

Examples of the disclosure automatically associate user devices based on network service subscriptions of a user. Connection statistics for a first computing device associated with the user are accessed by a processor. The connection statistics represent connections of the first computing device with a network providing one or more services offered by an entity. The user has a subscription to the services offered by the entity. Based on the accessed connection statistics for the first computing device, a second computing device is determined to be associated with the user. Based on the determination that the second computing device is associated with the user, the second computing device is automatically associated with the subscription to access the one or more services offered by the entity.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Figure 1:
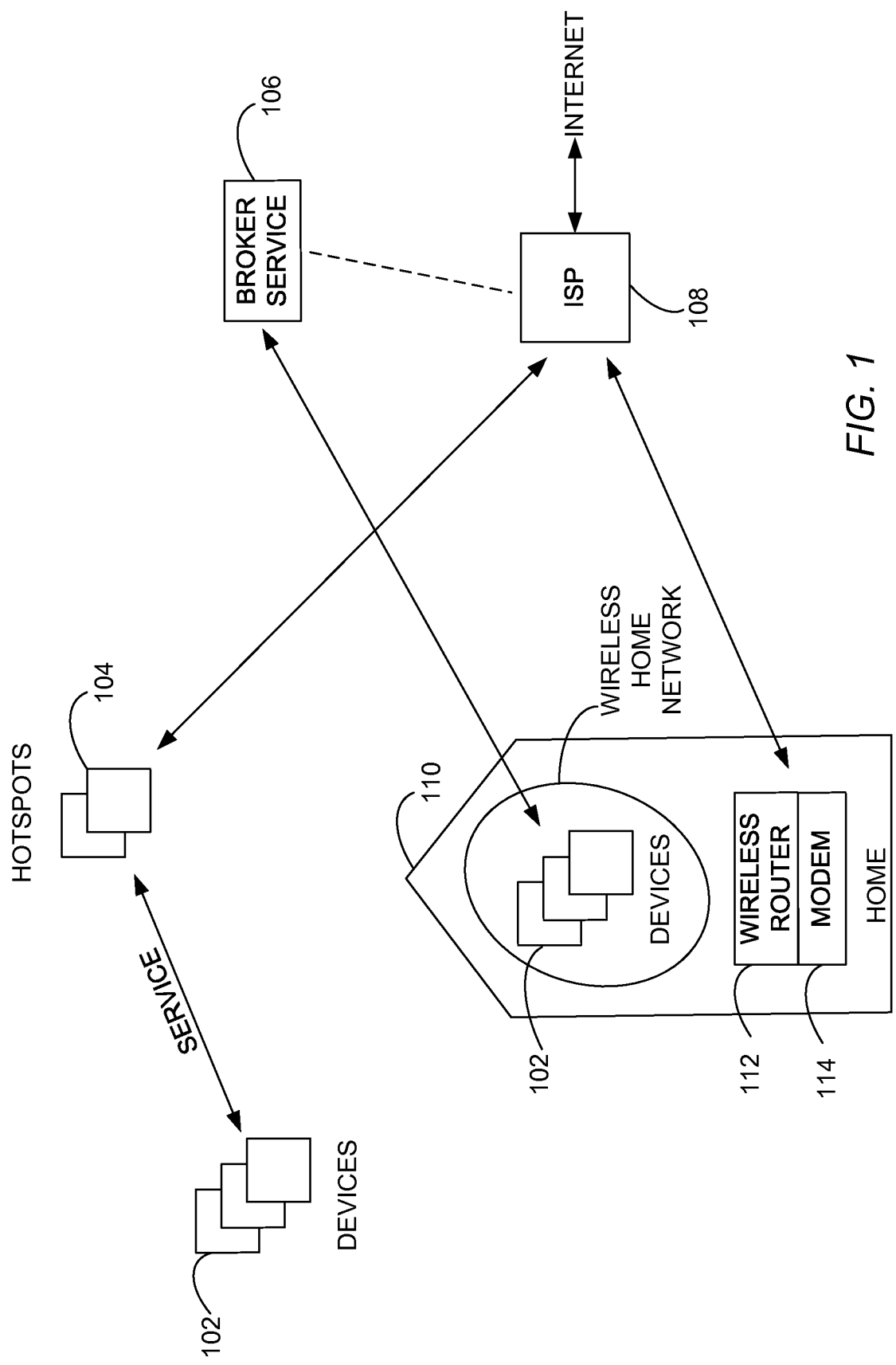
FIG. 1 is an exemplary architecture of a system illustrating multiple devices connected to a home wireless network and/or hotspots.

Referring to the figures, examples of the disclosure enable automatically associating devices of a user with an entity based on one or more network service subscriptions of the user. In some examples, connections between the devices 102 and a network are monitored to generate connection statistics. The network provides or otherwise delivers the services offered by the entity (e.g. a service provider), and the user has a subscription for some of the services offered by the entity. The generated connection statistics are compared with one or more criteria (e.g., at least seven connections of at least one hour duration each during last one week) stored in memory (e.g., of the computing device 102 or a third party broker service 106). The comparison identifies and/or confirms with a confidence score that the device 102 is associated with the user. At least one of the devices 102 of the user is automatically associated with the subscription of the user based on the comparison of the generated connection statistics and the criteria (e.g., criteria 212).

Some aspects of the disclosure further enable automatically connecting the devices 102 associated with the user to the network. As an example, the network may be at a different location (e.g., able to access a hotspot 104 managed by the entity) than the location of a home network (e.g., a wireless home network). In some examples, the network at the different location may be offered by a third party service provider who may be associated with the entity under some agreement to let the subscribers of the entity connect to the different network. Because the devices 102 are automatically identified as associated with the user as described herein, the devices 102 connect to the network and/or the different network with the same subscription. In this way, the user does not need to remember the credentials for the subscription when connecting to the network at the different location. Further, the user does not need to waste time entering the credentials and instead may access the services of the entity through any of the networks associated with the entity. In some examples, the entity or the third party service provider may offer additional services by presenting on the device a notification advertising the additional services.

Referring again to FIG. 1, an exemplary architecture of the system illustrates multiple devices 102 connected to a home wireless network and/or hotspots 104. FIG. 1 illustrates an exemplary topology with multiple devices 102 connected to the home wireless network, provided at a home 110, which is in turn connected via wireless router 112 and modem 114 to the ISP 108. The ISP 108 also operates or partners with wireless hotspots 104. Devices belonging to the same household (or other devices identified by the user) connect to the hotspots 104 and gain network access. The third party broker service 106 is depicted as facilitating the association between the devices 102 and the ISP 108. The broker service 106 and the devices 102 communicate via any channel (e.g., Internet connection, short messaging service, and/or the like). The broker service 106 also has a relationship, and communicates, with the ISP 108 to allow for authentication, authorization, accounting and/or targeting offers from the ISP 108.

FIG. 1 represents a system for automatically associating the computing devices 102 of the user, for example, to a hotspot 104 associated with an entity such as ISP 108 which provides, for example, Internet service to the devices 102.

Figure 2:
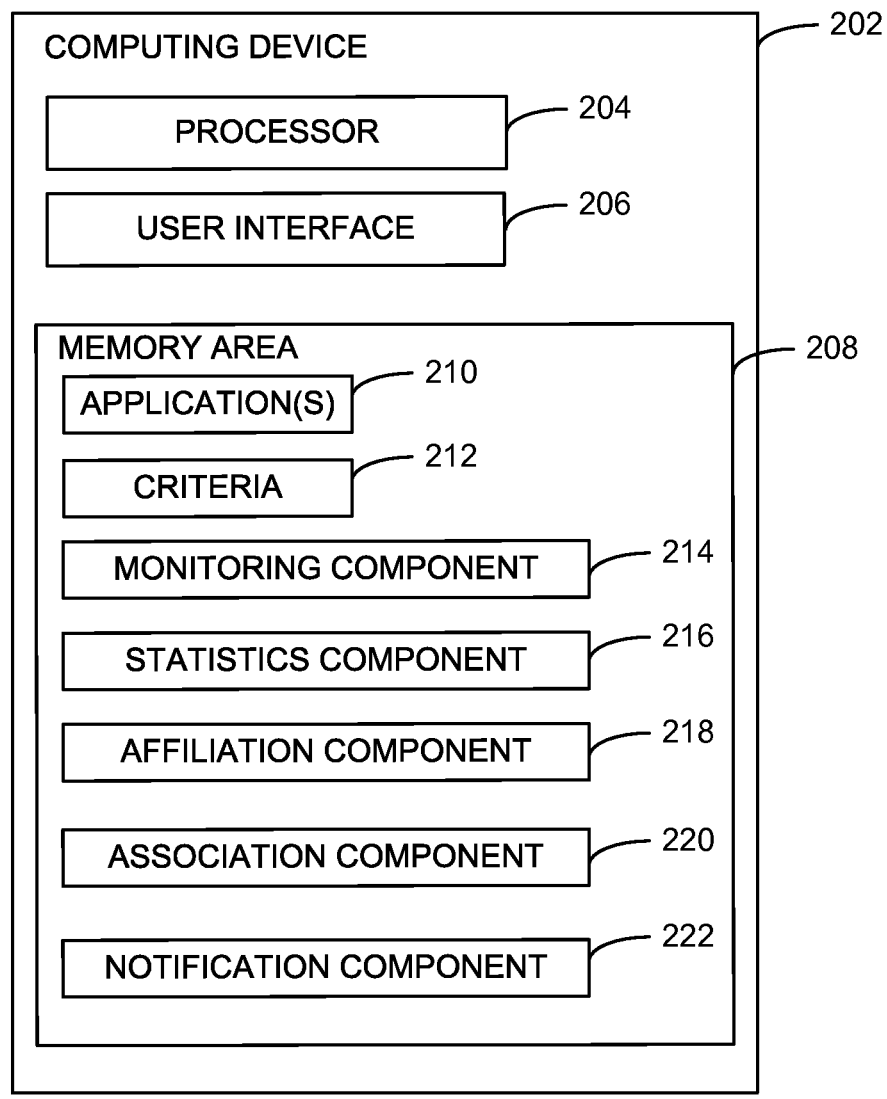
FIG. 2 is an exemplary block diagram illustrating a computing device associated with a user.

Referring next to FIG. 2, an exemplary block diagram illustrates a computing device 202 associated with the user. The computing device 202 is an example of the devices 102 in FIG. 1. The computing device 202 represents any device executing instructions (e.g., as application programs, operating system functionality, or both) to implement the operations and functionality associated with the computing device 202. The computing device 202 may include a mobile computing device or any other portable device. In some examples, the mobile computing device includes a mobile telephone, laptop, tablet, computing pad, netbook, gaming device, and/or portable media player. The computing device 202 may also include less portable devices such as desktop personal computers, kiosks, and tabletop devices. Additionally, the computing device 202 may represent a group of processing units or other computing devices.

In some examples, the computing device 202 has at least one processor 204, a memory area 208, and at least one user interface 206. The processor 204 includes any quantity of processing units, and is programmed to execute computer-executable instructions for implementing aspects of the disclosure. The instructions may be performed by the processor 204 or by multiple processors executing within the computing device 202, or performed by a processor external to the computing device 202. In some examples, the processor 204 is programmed to execute instructions such as those illustrated in the figures (e.g., FIG. 3 through FIG. 6). In some examples, the processor 204 represents an implementation of analog techniques to perform the operations described herein. For example, the operations may be performed by an analog computing device and/or a digital computing device.

The memory area 208 stores, among other data, the criteria 212 for associating the devices 102, associated with the user, with the subscription between the user and the entity. The subscription is related to the services offered by the entity and subscribed to by the user (e.g., the user may subscribe to some of the services offered by the entity). In some examples, subscription is to access the network of the entity.

The processor 204 is programmed to monitor, over time, connections between the devices 102 and a network to generate connection statistics. The network provides at least one of the services offered by the entity (or an associate of the entity). The generated connection statistics are compared to the criteria 212 stored in the memory area. Based on the comparison, at least one of the devices 102 is automatically associated with the subscription. In some examples, the automatic association of the device (e.g., any device associated with the user) means that the device is automatically associated with the same network of the entity for which the connection statistics are generated. In other examples, the automatic association of the device (e.g., any device associated with the user) means that the device is automatically associated with a different network of the entity (a network different from the one for which the connection statistics are generated).

The comparison of the generated connection statistics and the criteria 212 determines whether or not the network is a long dwell network. For example, if the generated connection statistics match the criteria 212 for defining a network as a long dwell network, then the device 102 is defined as having been connected with the network for a long time (e.g., a device having more than 20 hours of connection in the last week to a network may be enough to define the network as a long dwell network for that device and/or other devices associated with the user). In some examples, the generated connection statistics include calculating a dwell score. If the calculated dwell score exceeds a predefined threshold, the devices are tagged as having a long dwell relationship with the network. Determination of the long dwell networks enables aspects of the disclosure to determine whether to associate the computing device 202 with the entity associated with the network. Table 1 below provides exemplary statistics, criteria, and dwell score calculations.

TABLE 1

Exemplary Dwell Score Calculations.

| Generated Statistics | Criteria | Dwell Score |
| --- | --- | --- |
| 20 hours in last 5 days | 20 hours within last week | 100 |
| 20 hours in last week | 20 hours within last week | 100 |
| 20 hours in a week one month ago | 20 hours within last week | 50 |
| 20 hours in last 10 days | 20 hours within last week | 80 |

As shown in Table 1, if the generated statistics match or exceed the predefined criteria 212, then the dwell score is calculated to be 100. However, if the generated statistics (e.g., 20 hours in a week one month ago) does not match the predefined criteria 212 then the device 102 is assigned a lower dwell score (e.g., 50). In another example (e.g., 20 hours in last 10 days), the dwell score may be calculated as 80.

Alternatively or in addition to the long dwell determination, one or more confidence factors may be determined when identifying whether the device is associated with the user. When the confidence factor exceeds a predefined threshold value, the device is automatically associated with the subscriptions of the user. For example, a confidence factor greater than 80% determines that the device is associated with the user (e.g., no credential information is required from the user in such scenarios when attempting to connect to a network affiliated with the subscriptions of the user). In another example, a confidence factor between 50 and 80 reflects some uncertainty whether the device should be associated with the subscriptions of the user (e.g., the user may be asked to confirm the subscription, or provide only partial credential information). For a confidence factor less than 50, in some examples, the device is determined to be not associated with the user (e.g., the user is asked to provide full credential information to gain access to the services at the hotspot 104).

In some examples, the presence of an application associated with the ISP 108 on the device (e.g., the application is already installed on the device) may increase the value of the confidence factor.

The confidence factor may be used to serve advertisements or coupons related to the hotspot 104. For example, when the device is identified as associated with the same user who has a subscription with the ISP 108, this device is notified of a coupon to access free or discounted services (e.g., food/drink at the location of the hotspot 104) because the device is associated with the subscription to the ISP 108

(which in turn has some association or relationship with the establishment providing the hotspot 104). In this way, the user experience is of a substantially higher quality if the confidence factor is high.

In response to the association of the device with the network associated with the entity, the processor 204 may perform at least one of the following actions: activate a pre-loaded application on the associated device, download an application from the entity, remove an installed application associated with a different entity (e.g., a pre-installed application from another entity which is no longer in use may be uninstalled), etc.

In some examples, the processor 204 is further programmed to prompt the user to download a targeted content item including, for example, an application, push ads, and/or push certificates. For example, the user is notified about the availability of free internet access to the user at the hotspot 104 because the user has a subscription to the entity that in turn has an arrangement or association with the hotspot 104 to offer free internet access to its users. As another example, the user is provided with a discount coupon to a restaurant near the hotspot 104. The coupons may also be time-sensitive or otherwise delivered as a function of time (e.g., if the current time is nearing lunchtime, a coupon for a lunch special may be delivered).

The computing device 202 further has one or more computer readable media such as the memory area 208. The memory area 208 includes any quantity of media associated with or accessible by the computing device 202. The memory area 208 may be internal to the computing device 202 (as shown in FIG. 2), external to the computing device 202 (not shown), or both (not shown). In some examples, the memory area 208 includes read-only memory and/or memory wired into an analog computing device.

The memory area 208 stores, among other data, one or more applications 210. The applications 210, when executed by the processor 204, operate to perform functionality on the computing device. Exemplary applications 210 include mail application programs, web browsers, calendar application programs, address book application programs, messaging programs, media applications, location-based services, search programs, and the like. The applications 210 may communicate with counterpart applications or services such as web services accessible via a network. For example, the applications 210 may represent downloaded client-side applications that correspond to server-side services executing in a cloud.

The memory area 208 further stores the criteria 212 to identify whether the devices 102 are associated with the user who has a subscription with the entity. Exemplary criteria 212 describe that, for the computing device 202 of the user to be associated with a subscription of the user to an ISP, the computing device 202 should be connected to the network associated with the ISP for a predefined number of times, with each connection lasting for at least a predefined duration during a predefined time period. The criteria 212 may be defined by the entity, the third party service provider and/or the user of the computing device 202 (e.g., user configurable setting).

The memory area 208 further stores one or more computer-executable components. Exemplary components include a monitoring component 214, a statistics component 216, an affiliation component 218, an association component 220, and a notification component 222. A communications interface component (not shown) and a user interface component (not shown) may be stored in the memory area 208. The monitoring component 214, when executed by at least one processor causes the at least one processor to monitor connections between one or more devices 102 and one or more of a plurality of networks associated with a service provider. For example, connections between the computing device 202 and the networks (e.g., a home network and an enterprise network) associated with a service provider are monitored. The home network and the enterprise network may by separated by filtering the enterprise network by the IP addresses known to be associated with the enterprise network or by any other technique known in the art.

The statistics component 216, when executed by at least one processor causes the at least one processor to generate connection statistics based on the monitoring of the connections by the monitoring component 214. For example, connection statistics is generated based on the monitoring of the connections of the computing device 202 and the networks (e.g., the home network and the office network). The affiliation component 218, when executed by at least one processor causes the at least one processor to infer, based on the generated statistics, that the one or more devices 102 (e.g., the same computing devices 102 for which the connections are monitored or even any other computing device 202 associated with the user for which the connections are not monitored) are associated with the subscription of the user to access the one or more of the plurality of networks associated with the service provider. The affiliation component 218 adds the plurality of networks to a watch list. In some examples, only the networks with which the connections are monitored may be added to the watch list. In another example, a list of networks associated with the entity (e.g., the service provider) may be downloaded from the entity or the third party broker service 106 for addition to the watch list.

The association component 220, when executed by at least one processor causes the at least one processor to automatically associate, based on the inference, the one or more devices 102 with at least one of the plurality of networks associated with the service provider. For example, the computing device 202 for which the connections are monitored may be automatically connected to the networks for which the connections are monitored or even with the networks for which the connections are not monitored (e.g., such networks may be associated with the service provider but there may not be any connection statistics available). In some examples, other computing devices 202 (e.g., for which the connections have not been monitored or computing devices 202 which are trying to connect to the network for the first time) may be automatically connected to any of the networks associated with the service provider. In such an example, the computing device 202 associated with the user may be connecting with this particular network for the first time, and still the computing device 202 is automatically connected with the network per the operations described herein. For example, even a brand new computing device 202 may automatically connect with the network without providing credential information for the subscription once that computing device 202 has been associated with the subscription per the operations described herein. In such an example, the user signs into a user account (e.g., associated with the service provider) using the new device. The new device automatically connects to hotspots 104 associated with the entity when the new device is in proximity of those hotspots 104.

In some examples, the association component 220 automatically associates the computing devices 202 with the networks in a watch list. For example, the computing device 202 is automatically connected with the networks that are present in the watch list, whereas the computing device 202 may be manually connected to networks not present in the watch list. The watch list may be stored in the memory area associated with the computing device 202 or the watch list may be stored by a web service (e.g., the third party broker service 106) on the cloud.

The notification component 222, when executed by at least one processor causes the at least one processor to notify the computing devices 202 with targeted content for the user. The targeted content includes at least one of an application, push ads, and/or push certificates. In such examples, the user of the computing device, on accepting the notification, may be automatically connected to the network providing the services that are accessible through the subscription of the user. In this way, the same subscription is used to automatically access the services from the entity and/or the associates of the entity.

In some examples, the communications interface component includes a network interface card and/or computer-executable instructions (e.g., a driver) for operating the network interface card. Communication between the computing device and other devices may occur using any protocol or mechanism over any wired or wireless connection. In some examples, the communications interface is operable with near-field communication (NFC) tags.

In some examples, the user interface component includes a graphics card for displaying data to the user and receiving data from the user. The user interface component may also include computer-executable instructions (e.g., a driver) for operating the graphics card. Further, the user interface component may include a display (e.g., a touch screen display or natural user interface) and/or computer-executable instructions (e.g., a driver) for operating the display. The user interface component may also include one or more of the following to provide data to the user or receive data from the user: speakers, a sound card, a camera, a microphone, a vibration motor, one or more accelerometers, a BLUETOOTH brand communication module, global positioning system (GPS) hardware, and a photoreceptive light sensor. For example, the user may input commands or manipulate data by moving the computing device 202 in a particular way.

Figure 3:
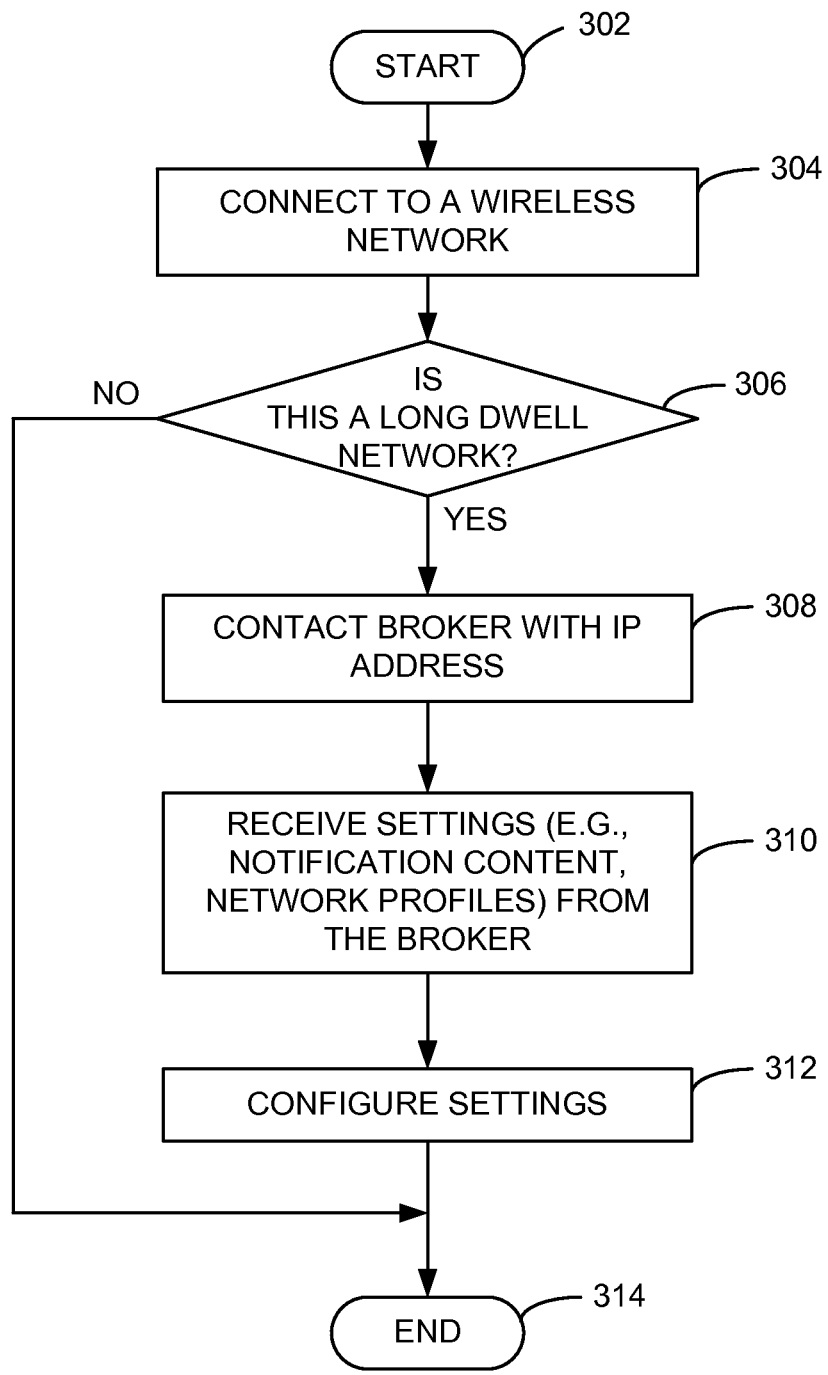
FIG. 3 is an exemplary flow chart illustrating operation of the computing device to receive notifications from a broker and to configure settings based on the received notifications.

Referring next to FIG. 3, the exemplary flow chart illustrates operation of the computing device 202 to receive notifications from a broker service 106 and to configure settings based on the received notifications when connecting to a long dwell network. While described with reference to "long dwell" as the criteria for associating the device with subscriptions of the user in this example, other criteria are contemplated.

At 302, operations are performed by the device when connecting to a qualified "long dwell" or otherwise "high dwell" network. At 304, connection to a wireless network is established. At 306, a determination is made if the network is "long dwell" network. If the determination is "NO" then the process ends at 314. However, if the determination is "YES" then at 308 the third party broker service 106 receives the IP address (e.g., the IP address that is assigned to the device by the network) and infers the ISP from the received IP address using an IP address registry 706. For example, the third party broker service 106 infers the ISP associated with the IP address of the device 102 of the user using the IP address registry 706. In such examples, a correspondence, map, or other relationship of the ISPs and their IP addresses may be stored in the memory area 208. At 310, settings (e.g., notification content, network profiles etc.) from the third party broker service 106 are received by the device. At 312, the device is configured as per the received settings and the process ends at 314.

For example, if the device satisfies a pre-defined or pre-configured threshold for duration and number of times connected to the same wireless network in a given period of time, and/or if the IP address of the device matches an IP address belonging to an ISP that provides services (e.g., public hotspot access), the device is implicitly authenticated and authorized to use the service, without requiring the user to provide any further credentials to the network. In another example, the broker service 106 sends a notification for display to the user (or initiates a notification to be displayed to the user), such as "We think you are a subscriber to ISP #1. Do you agree?" When the user replies in the affirmative by tapping, clicking, saying or otherwise indicating "Yes", the device is then associated with the ISP 108. In other examples, there is no notification displayed to the user. Rather, the broker service automatically associates the device 102 with the ISP 108 without receiving confirmation from the user. Another way is to target the device with a notification that a special application from or for the user's ISP 108 is available for download. The notification may contain a link to the application in the application store. The notification may be timed in a way that it is presented to the user in a relevant situation. For example, the notification is presented to the user when the user is in proximity of a hotspot 104 operated by the ISP 108 and the user is interacting with the phone (e.g., the screen is on and/or unlocked).

A certificate, credentials or other data structure, stored on the device and/or broker service 106, indicates that device is associated with the ISP 108. Further, the "long dwell" network is marked, tagged, flagged or otherwise indicated on the device as a long dwell network.

After associating the device with the ISP 108, aspects of the disclosure enable time-limited authentication and authorization for the device to assure that the user will not receive access to the services after leaving the relationship with the ISP 108, in some examples.

Figure 4:
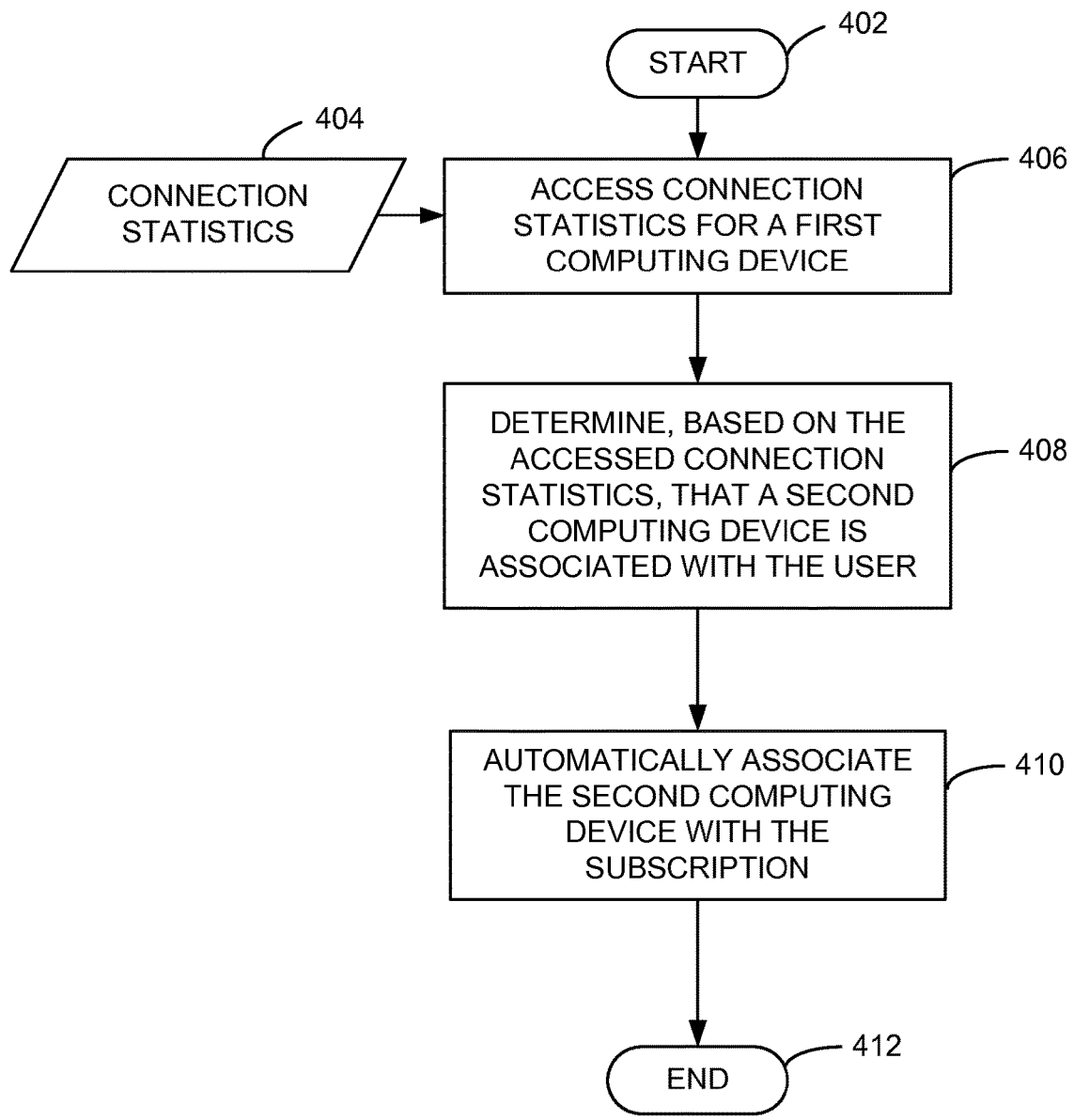
FIG. 4 is an exemplary flow chart illustrating operation of the computing device to automatically associate a computing device with a subscription of a user based on connection statistics for another computing device.

Referring next to FIG. 4, the exemplary flow chart illustrates operation of a computing device to automatically associate a second computing device with the subscription of a user based on connection statistics for a first computing device. At 402, operations performed by a processor associated with the computing device start. At 406, the processor accesses the connection statistics (available at 404) for the first computing device associated with the user. The processor may be associated with the first computing device or a computing device associated with the entity or a third party associated with the entity. The connection statistics (e.g., stored at 404 in the memory area) represent connections of the first computing device with the network providing one or more services offered by the entity. The user has a subscription to the one or more services offered by the entity. At 408, a determination is made whether the second computing device is associated with the same user who has the subscription. This determination is based on the accessed connection statistics (e.g., as accessed at 406) for the first computing device. At 410, the second computing device is automatically associated with the subscription based on the determination that the second computing device is associated with the same user who has the subscription. At 412, the process ends.

In these examples, the second computing device is automatically associated by connecting with the network providing the one or more services offered by the entity. For example, the second computing device is automatically associated without user input (e.g., credentials, identifiers, subscription information, and the like). In some examples, the first computing device or the second computing device is automatically associated with another network (e.g., different from the network for which connection statistics are accessed) providing the one or more services offered by the entity. In such examples, the location of the other network is different from the location of the network for which connection statistics are accessed. For example, the device (e.g., the first or the second computing device) of the user still connects automatically even if it is trying to connect to the network for the first time (e.g., no earlier connection statistics available). In this way, any of the user devices 102 may automatically connect to any network or associate network of the entity for which the user has a subscription and at least one of the user devices 102 regularly accesses the network of the entity. Regularly accessing is defined by the criteria 212 as described herein under various examples of this disclosure.

In some examples, the connection statistics include at least a frequency and duration of the connections of the devices 102 (e.g., the first computing device) of the user with the network. Aspects of the disclosure are applicable when a single device's connection statistics are monitored or when multiple devices' connection statistics are monitored (the multiple devices' connection statistics are merged into a single set of connection statistics for the user). In some examples, when the second computing device is at the hotspot 104, the second computing device is notified about the availability of the one or more services offered by the entity. If the user of the second computing device accepts the notification, the one or more services offered by the entity are provided to the second computing device after automatically associating the second computing device with the subscription.

Figure 5:
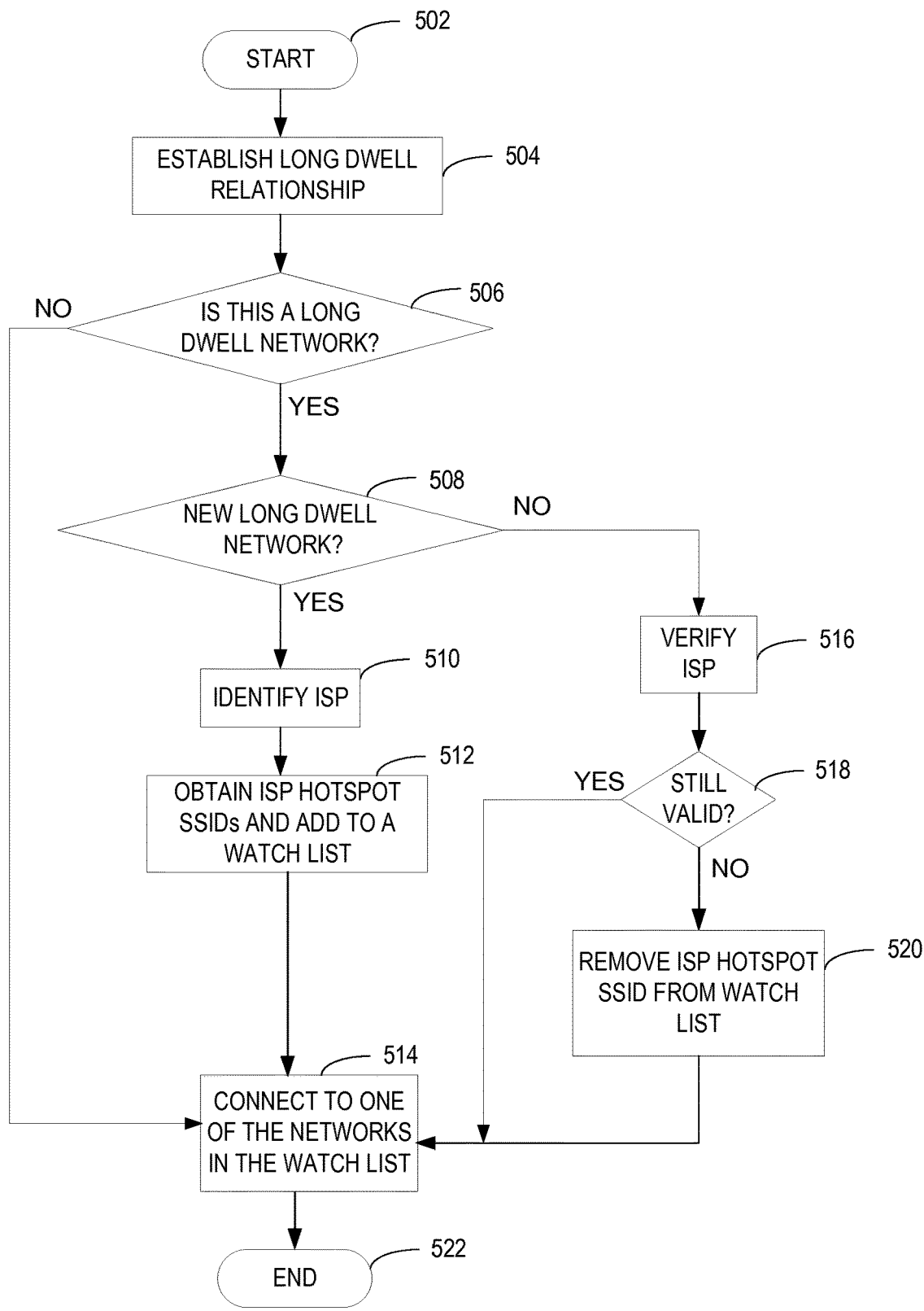
FIG. 5 is an exemplary flow chart illustrating operation of the computing device to maintain a watch list of long dwell networks and to connect to one of the networks in the watch list.

Referring next to FIG. 5, the exemplary flow chart illustrates operation of the computing device 202 to maintain a watch list of long dwell networks and the computing device 202 connects to one of the networks in the watch list. At 502, operations performed by the processor associated with the computing device begin. At 504, a long dwell relationship is established (e.g., by monitoring connections of all computing devices 202 of the user with the network). At 506, a determination is made whether the network is a long dwell network (e.g., if the monitored connection statistics at least match the criteria 212 stored in the memory area then the network is tagged as a long dwell network). If the determination at 506 is "NO", at 514 the device is connected to one of the networks in the watch list and the process ends at 522. However, if the determination at 506 is "YES", at 508 a determination is made whether the network is a new long dwell network (e.g., if the network is not in the watch list then it is a new long dwell network). If the determination at 508 is "YES" then the ISP 108 is identified at 510. For example, the ISP may be inferred, identified, or otherwise determined by matching the IP address of the device 102 with one of the IP addresses known to be associated with one of the ISPs. The identified ISP 108 and the hotspot 104's service set identifications (SSIDs) are obtained and added to the watch list at 512. Thereafter, at 514 the device is connected to one of the networks in the watch list and the process ends at 522.

However, if the determination at 508 is "NO" then the ISP 108 is verified at 516 (e.g., by verifying that the ISP 108 is same as the ISP 108 with which the user has a subscription). At 518, a determination is made whether the subscription to the ISP 108 is valid or not. On determining that the subscription is not valid (e.g., the subscription has expired or the user is no longer a subscriber of the network), at 520 the ISP 108 and the hotspot 104's SSIDs are removed from the watch list. However, if the determination at 518 is that the subscription to the ISP 108 is valid, at 514 the device is connected to one of the networks in the watch list and the process ends at 522.

Figure 6:
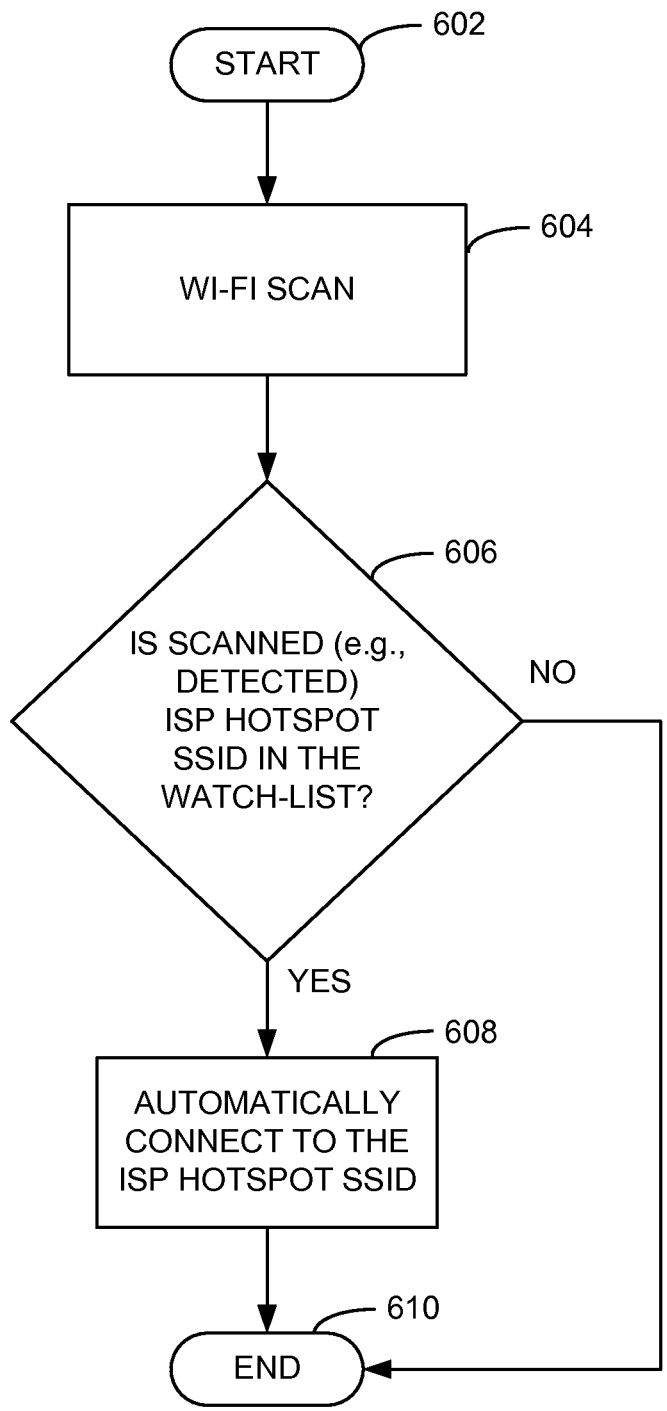
FIG. 6 is an exemplary flow chart illustrating operation of the computing device to automatically connect to a detected ISP hotspot in the watch list.

Referring next to FIG. 6, the exemplary flow chart illustrates operation of the computing device to automatically connect to a detected ISP hotspot (e.g., the hotspot 104 associated with the ISP 108) in the watch list. At 602, operations performed by the processor associated with the computing device start. At 604, Wi-Fi networks are scanned or otherwise detected to identify a network within range of the device. At 606, the device determines if one of the scanned hotspot SSIDs is in the watch list (e.g., the hotspot 104 is associated with the ISP 108). If the determination at 606 is "NO" then the process ends (e.g., without connecting to the hotspot 104 because the user does not have a valid subscription to the ISP 108). However, if the determination at 606 is "YES" then the device is automatically connected to the ISP 108's hotspot SSID at 608 and the process ends at 610.

Figure 7:
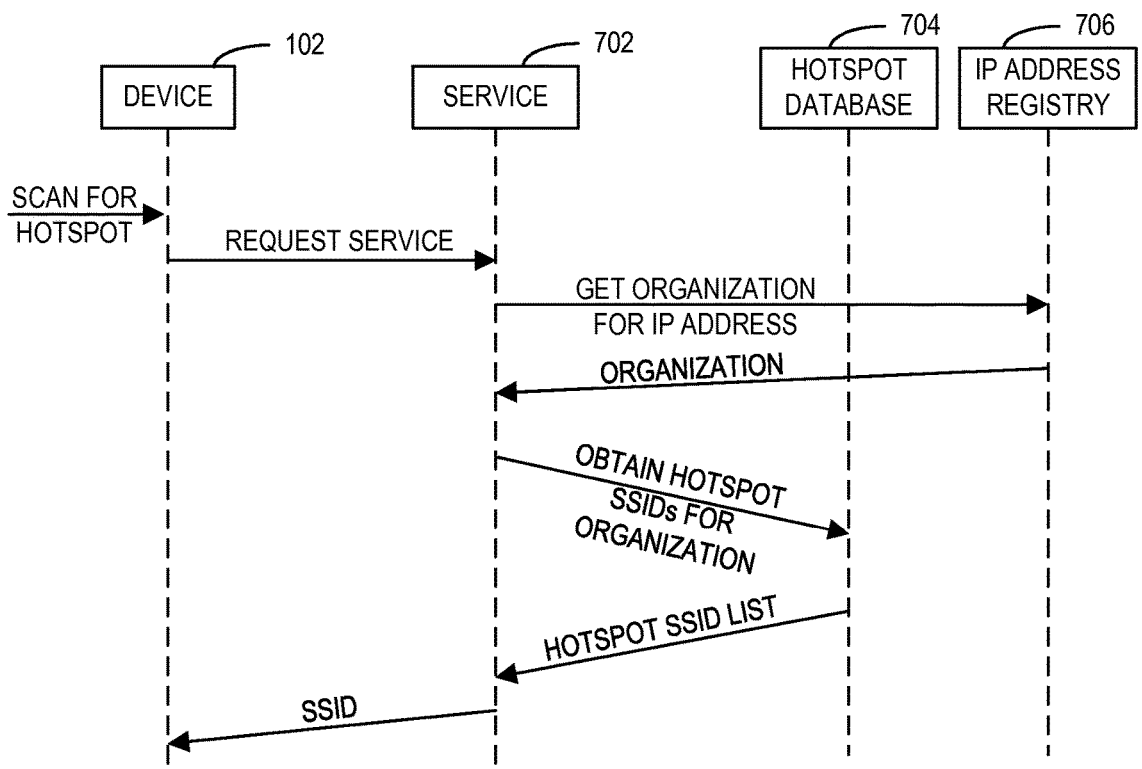
FIG. 7 is an exemplary sequence diagram illustrating sequence in which the computing device receives a service set identifier (SSID) for the services offered by the hotspot.

Referring next to FIG. 7, the exemplary sequence diagram illustrates a sequence in which the computing device receives an SSID for the services offered by the hotspot 104 to identify and/or verify whether the device has a subscription for accessing the services provided at the hotspot 104. The service 702 receives a request to service the device 102 (e.g., provide Wi-Fi). The service 702 requests the organization that owns the IP address from an IP address registry 706 which in response to the request provides the name of the organization. Thereafter, the service 702 requests the hotspot database 704 to obtain the hotspot SSIDs for the organization. The hotspot database 704 returns the hotspot SSID list to the service 702, which in turn provides an SSID of the hotspot 104 to the device 102. The device compares the received SSID with the SSIDs in the watch list to determine whether the hotspot 104 belongs to an organization to which the user has a subscription. If the received SSID matches with one of the SSIDs in the watch list, the device 102 is automatically connected (e.g., as described by some operations illustrated in FIGS. 5 and 6).

Figure 8:
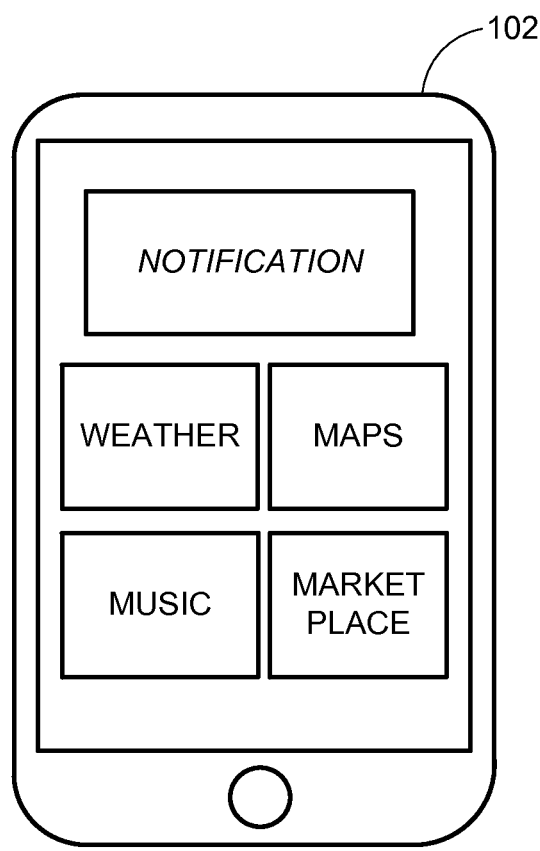
FIG. 8 is an exemplary user interface diagram illustrating an exemplary mobile telephone that presents a notification or an indication to the user of an offer.

Referring next to FIG. 8, the exemplary user interface diagram illustrates an exemplary mobile telephone that presents a notification or an indication to the user of an offer. The exemplary user interface on device 102 shows a notification as discussed under aspects of the disclosure, and shows other applications installed on the mobile telephone (e.g., applications like weather, maps, music, and market place are installed). The notification may be highlighted or shown under different conditions (e.g., different font, color, size, sent as an SMS, etc.), so as to attract the user's attention and desire for a certain service Aspects of the disclosure enable a smartphone that is owned by the user (e.g., subscriber) to automatically connect to Internet hotspots 104 (or other network access points) that are offered, connected, affiliated, or otherwise associated with the ISP to which the user subscribes. In some examples, the automatic connection occurs without the user having to enter credentials to access the hotspot 104. To enable such scenarios, aspects of the disclosure automatically associate the device with the ISP subscription, thus allowing the device to take advantage of services (e.g., Internet access outside a home network) the ISP offers without any user intervention. The ISP may also offer additional services such as by presenting, for example, a notification on the device advertising the additional services.

Some examples are implemented as a broker service that may be managed by (1) the ISP, (2) the device, and/or (3) a separate clearinghouse or other third party service (e.g., a cloud service such as a broker service 106) that manages the relationship between the device and ISP. The broker service 106 may communicate with the device over any channel, such as the Internet and/or short message service (SMS).

While described in some examples as connecting to the Internet, aspects of the disclosure operate to enable the device to connect to any network (e.g., intranet, corporate or enterprise network, peer-to-peer network, etc.).

Further, while described with reference to the ISP 108, those skilled in the art will note that Internet service may be provided by a home, enterprise ISP (e.g., satellite or cable company), and/or a temporary ISP (e.g., a hotel ISP) that offers information, coupons, etc. in the area the user is visiting.

Example Scenarios for Associating the Device with the ISP Subscription

Aspects of the disclosure associate the device 102 that frequently accesses a wireless network with the ISP account through which network access (e.g., Internet service) is provided. In general, "frequently" describes the frequency and duration that the device is connected to the same wireless network within a pre-defined period of time. If the user frequently connects to the same network for long durations (e.g., a home network), aspects of the disclosure infer, conclude, or otherwise determine that the device is legitimately owned and operated by the user associated with the ISP account (e.g., a subscriber of the Internet service) as opposed to an occasional or casual visitor (e.g., a friend). In this manner, services that the ISP 108 offers outside the home network (or other designated location) of the user (e.g., subscriber) are extended to the device when the device is outside the home network (e.g., "on the go").

The broker service 106 (or other third party entity) associates the ISP 108 with the home network based on the public Internet Protocol (IP) address of the device 102 when accessing the Internet either directly or via a proxy or network address translation (NAT) entity. This public IP address is associated with or assigned to only one of the ISPs, and published in public directories. As such, even if the IP address of the device changes (e.g., the ISP assigns another IP address), the new IP address may be looked up in public directories, thus allowing association of the device 102 to a specific ISP 108 that owns the same IP addresses. "Owning" an IP address as described herein includes being able to use the IP address such as via ownership, registration, assignment (e.g., by Internet authority), lease agreement, and/or the like.

If the device 102 is associated with the account holder (e.g., user), the device 102 may be targeted for services such as free hotspot access, coupons, etc. The device 102 may be targeted by the ISP 108 and/or the broker service 106.

Example Scenarios for Using Long Dwell Networks to Associate Device with ISP

Aspects of the disclosure are operable with any means for establishing "long dwell" of the device with a network. Using the frequency and duration, as described herein, is one example. In such an example, measuring the frequency and duration of a connection of the device to the same network (e.g., wireless network) over time (e.g., maintaining a history) enables some examples to infer that the device belongs to the user that subscribes to the ISP, and not to an occasional visitor. That is, if the user's device is connected for at least a defined duration within a defined period of time on multiple occasions, aspects of the disclosure conclude that the device is associated with the user who is a subscriber to the ISP 108.

In one scenario, the user connects to the same wireless network for one week on five separate occasions for a total of 25 hours. The broker service in accordance with aspects of the disclosure concludes that the device is owned or legitimized by the owner of that wireless network (e.g., a home network). The broker service 106 may also enforce a custom threshold for dwell time, or check other device-specific attributes for confirmation. For example, the broker service may query the device to determine the manufacturer of the device, and accordingly provide different services/links to different applications. Similarly, ISPs may impose different thresholds for determining the association between the device and the ISP, such as 25 hours or 10 hours.

In examples involving the broker service 106, the broker service 106 identifies the ISP 108 to which the home network is attached. This may be done, for example, by looking up the ISP 108 to which the public Internet address of the "long dwell" network is mapped. This may happen once, or every time the user connects to the network.

For example, the user is a subscriber of ISP #1. This user has multiple devices 102 connected to the wireless home network via the wireless home router. The wireless home router is connected to the modem which in turn is connected to ISP #1. The user connects the device to the secure wireless home network. The device automatically connects to the wireless network when the user is at home and the device is in range of the wireless network. Over a span of time (e.g., one week), the device has been connected, for example, 20 hours on a total of three occasions. At this point, the network may be deemed a "long dwell" network.

The next time the user visits a hotspot 104 where ISP #1 provides free access to its subscribers, the device automatically connects without the user having to enter credentials. In this manner, the user no longer has to remember and enter credentials. However, a friend that is visiting the user and connects to the network is not automatically connected to the hotspot as the network is not identified on the friend's device as a "long dwell" network. Likewise, if the user changes the Internet service (e.g., no longer with ISP #1), the hotspot connection no longer occurs as the profiles expire and are eventually removed from the device. To assure awareness, branding information may be displayed to the user.

An additional step to safeguard against fraud includes geographical verification and conditions placed on the network to mark it as "long dwelled" (e.g., for security). Further, a token type system may be included to assure that the service is only offered to legitimate users. For example, the credentials may allow the user to get onto the network with only limited services, and those limited services then provide additional authentication based on the current account status of the user, such as by using 802.1x.

In a particular example, the long dwell networks of the user are detected in an automatic fashion, and this detection is not exposed to the user. The Wi-Fi stack tracks the following variables for each network, in this example:

AD: Average duration of a connection on the network to date (e.g., total time on the network, quantity of successful connections)

LC: Time since last successful connection to that network.

To determine if a network is among the user's long dwell networks or not, a combination of AD and LC are calculated such that:

Networks with high AD are prioritized over those with lower AD

Networks with low LC are prioritized over those with higher LC

As an example, a dwell score may be represented as shown in Equation (1) below, where C1 and C2 are relative weights, and t is current time:

$$\text{Dwell Score} = C1 * AD | C2 * (t-LC) \quad (1)$$

In some examples, high AD is weighted more than low LC for deciding long dwell network. For example, if a network has a very high average connection duration but has not been connected to for a while, the network is prioritized over another recently-connected network with medium connection duration. To this end, the weights C1 and C2 are chosen such that:

Networks with higher average duration have higher dwell score

Networks with more recent last connection have higher dwell score

Networks with very high average duration (>4 hours) have higher dwell score even if the time of last connection is not recent After this combination is calculated, a threshold is imposed to tag a network as "long dwell" or not. If the dwell score exceeds the threshold, the network is tagged as a long dwell network. In some examples, the threshold is chosen such that a long dwell network has an average duration of 2 hours or more, or the last connection time is within a day.

Connection statistics other than frequency and duration are also within the scope of the disclosure.

In another example for determining long dwell, the user may explicitly pick or otherwise designate home and work networks. In still another example, through a location based (e.g., geofencing service), aspects of the disclosure identify the user's high dwell locations and then identify the network(s) to which the user connects while in those locations.

Example Scenarios for Delivering Services after Associating Device with ISP

For each network that meets the "long dwell" criteria 212, the broker service 106 may establish certain rules. For example, for enterprise networks, the user may be allowed to connect through contracted hotspots for free, assuming there is an established business relationship and device/user authorization is successful.

Information sent to the broker service 106 from the device may include ways to target the device, such as by implicit IP address or phone number for use of SMS, session initiation protocol (SIP) address or the like. Furthermore, the information may contain device-specific or user-specific credentials.

If the wireless network is connected to the Internet via the ISP 108, the ISP 108 may associate each of the devices 102 that meet the criteria 212 (e.g., in terms of connection time) as legitimately owned and operated on the wireless network. The ISP 108 thus may extend services to the devices 102 beyond just providing Internet access to those devices 102. On the device-side, once the device is considered a "long dwell" device, an authorization component or application on the device may reach out to the broker service 106 to request authentication and authorization for services provided by the ISP 108 (e.g., services in addition to home Internet service). The service may include network names of hotspots 104 operated by the ISP 108, hotspot locations, and hotspot profiles with authentication credentials to access the hotspots 104 operated or contracted by the ISP 108.

In this manner, the next time the device now associated with the ISP 108 comes within range of such a hotspot 104, the device automatically connects to the hotspot 104 without the user having to enter credentials or otherwise authenticate.

In some examples, the device receives a targeted notification indicating to the user that additional services offered by the ISP 108 are available. The targeted notification may include a link to an application the user may download onto the device. Such a notification may appear on the device when connected to the home network, or when in proximity to a hotspot 104 or business which extends offers of the ISP 108.

By associating the device with the ISP 108 based on long dwell time on the user's home network (that is connected to the ISP 108) or other threshold or criteria 212, the various ISP services become available to the device. Those skilled in the art will note that the various ISP services described herein are not limited, and that other ISP services not specifically described herein are within the scope of the disclosure.

Further, the broker service 106, ISP 108, or other entity may leverage the connection statistics used to make the association between the device 102 and the ISP 108 to identify particular advertisements or promotions. For example, if the connection statistics indicate that the device connected mostly during the lunch hour, particular ads or promotions relating to lunch may be delivered.

Disassociating the Device from the ISP

The profile/credentials on the device are periodically refreshed to assure that the user is still authorized (e.g., contractually associated with the ISP 108), such as by using an expiry date (e.g., three weeks) to assure the service discontinue after the user cancels the service agreement with the ISP 108.

In some examples, the network is not deemed "long dwell" if some of the settings change (e.g., password change) or if the user fails to connect to the network for an extended period of time. In such examples, after a defined period of time, the network is no longer marked as "long dwell" for the device and authentication credentials are revoked. In another example, if the authentication by the ISP 108 or the broker service 106 determines the contract provisions between the user and the ISP 108 have been violated (e.g., the number of devices associated with the ISP 108 is not in accordance with the service agreement), the device 102 may be disassociated from the ISP 108.

Associating the Device with Subscriptions/Accounts Other than the ISP

Providing Internet service to the device in itself is just one of the possible indications that the device/user has a subscription with an entity that provides services to the device/user. Other methods use a service such as a search using a preferred provider that triggers authentication and authorization to access the service and or being targeted with notifications of special offers, etc.

In such an example, the "long dwell" criteria or other criteria 212 is applied to different service providers other than (or in addition to) ISPs. An example is search engine usage or membership affiliation. If the device meets "long dwell" criteria 212 with the search engine (e.g., frequent use of a particular search engine over a period of time), additional services (offered by the search engine company) may be provided such as free hotspot access. The broker service may associate the device with the search engine company/product and target the device specifically with additional services offered by the search engine.

Providing ISP Association Using Common Accounts

Alternatively or in addition, aspects of the disclosure are operable to associate devices 102 of the user with the ISP 108 by leveraging usage of a user account across the devices 102. For example, the user has five devices 102, all signed into a common user account (e.g., a mail account). If one of those devices 102 is connected to the home network and goes through the high dwell/ISP detection flow as described herein, that device gets configured with the ISP credential. Aspects of the disclosure (e.g., the broker service, mobile device, and/or other entity) then provide the ISP credential to each of the other devices 102 of the user that are associated with that user's account. For example, if a mobile telephone of the user gets the credentials for the ISP 108, the credentials are then shared to a tablet of the user and a laptop of the user because both the tablet and laptop are associated with the same user account (e.g., the user has provided sign-in credentials for the account on those devices previously).

In such an example, the broker service 106 maintains a repository or other data store identifying the subscriptions (e.g., and thus the credentials) associated with the user account. The broker service updates this data store as the devices 102 are determined, over time, to be associated with the subscriptions (e.g., based on the long dwell disclosure herein) and includes user account details (e.g., login, password, etc.) with the associations between the devices 102 and subscriptions.

The broker service 106 subsequently receives a request from one of the user devices 102 for the ISP credentials. The request identifies a user account. The broker service 106 performs a database lookup or other memory check based on the user account to see if any subscriptions (e.g., ISP service) are associated with that user account. If so, the broker service 106 provides the credentials for the subscription(s) to the requesting device, thus enabling the device to take advantage of the services associated with the subscription(s) without the user having to explicitly provide credentials associated with the subscription(s).

Additional Examples

In some examples, the broker service 106 is also able to distinguish between networks and provision for services respectively. One example of different networks includes a home network and an enterprise network. Aspects of the disclosure may filter by authentication type (e.g., extensible authentication protocol) or filter by the IP addresses known to be associated with the enterprises.

Dwell time of a network/location may be described, in some examples, as the period of time for which the user remains connected to a network or remains within a certain radius of a location. Connection frequency may be described, in some examples, as the number of times per week that a user connects to a network. Long duration networks may be described as, in some examples, networks where the user spends considerable time every time the user connects (e.g., connection time). This represents networks such as home, work, Wi-Fi at family's home, concert venues, etc. A long duration alone does not indicate high dwell as long duration does not consider the frequency with which the user connects to the network. For example, if Anna visits her friend Susan once a month and connect to her home network for 4 hours at a time, Susan's home network does not qualify as Anna's high dwell network; similarly, if Anna connects to a café Wi-Fi every day for 10 minutes, the café Wi-Fi is not be considered high dwell.

"High dwell" networks may be described, in some examples, as the networks that the user uses the most in terms of time as well as frequency. Examples include home, work and Wi-Fi at cafés visited regularly by the user.

In some examples, the device receives a notification like "We think you are a subscriber, please enjoy free Internet access" (e.g., when the user is in proximity of the hotspot 104) and the device may be automatically connected or manually connected (after the user receives the notification) to the hotspot 104. The hotspot 104 may be associated or operated by the ISP 108 (or partner ISP) of the user (e.g., the ISP 108 with which the user has the subscription). The ISP 108 may be providing internet services during stay at the hotel. This ISP 108 (through hotel) provides a promotional subscriber account that the user may use to access internet services provided at various hotspots in or around the city (e.g., when roaming in neighboring city). The ISP 108 may be an enterprise and the various offices of the enterprise may be the hotspots in such scenario. Therefore, the devices 102 of the user are automatically connected at all offices of the enterprise in such a scenario.

In an example scenario, dwell time may be monitored for the connections of one or more devices 102 associated with the user. The dwell time is the amount of time at the same IP address with the same network Identifier (e.g., same SSID) which is associated with the ISP 108. In this scenario, if any device of the user meets the criteria 212 (for dwell time) then all devices 102 of the user are automatically connected with the hotspot. Exemplary dwell time represents measures for exponential aging, number of unique connections (e.g., in contrast to the duration of connection), etc. The dwell time, in some examples, is calculated across multiple devices 102 and then aggregated over the multiple devices 102 (e.g., multiple mobile phones, or a hybrid with mobile phone, tablet, and laptop).

In some examples, the devices 102 of the user are associated with the user based on a location (instead of dwell time and/or in addition to dwell time). For example, if the user is determined to spend at least 10 hours a day within a particular area (e.g., at the home of the user), but connects to the network from the ISP 108 at the home very briefly, even then the network is determined to be a high dwell network and the devices 102 of the user are associated with the ISP 108. Now if this user travels to a hotspot 104 (associated or owned by the ISP 108), the device of the user is automatically associated with the subscription that the user has with the ISP 108.

In an exemplary scenario, the user (having subscription with a first ISP) visits a first hotspot. This first hotspot is associated with a second ISP. In one example, the first hotspot identifies the device as belonging to the first ISP and notifies the device about a nearby hotspot associated with the first ISP. In another example, the first hotspot identifies the device as belonging to the first ISP and notifies the device with a coupon to connect to the hotspot (e.g., free/discounted access) or make a competitive offer to the user of the device for taking services of the second ISP.

While the aspects of the disclosure describe that the devices 102 identified as associated with the user are automatically associated with the hotspot 104, in some examples, the devices 102 of users having a relationship as per the criteria 212 are also automatically associated with the hotspot 104. For example, the devices 102 of all the members of a family and/or close friends (determined based on techniques known in the art) are automatically associated by the hotspot 104 on determining that the relationship of the users of the devices 102 in the family. In this scenario, all devices 102 of a household are able to connect to the hotspot 104 automatically without providing credentials.

Alternatively or in addition to the other examples described herein, examples include any combination of the following:

monitor, over time, connections between the devices and a network to generate connection statistics compare the generated connection statistics to the criteria automatically associate at least one of the devices with the subscription based on the comparison the entity is an ISP and the services include a hotspot associated with the ISP prompting the user to download a targeted content item the targeted content item includes at least one of an application, push ads, or push certificates determine, based on the comparison, that the network is a long dwell network for the user the generated connection statistics include calculating a dwell score the devices are tagged as having a long dwell with the network when the calculated dwell score exceeds a predefined threshold responsive to associating at least one of the devices with the subscription, activate a pre-loaded application on the associated at least one of the one or more devices, download an application from the entity, or remove an installed application associated with a different entity at least one of the automatically associated devices connects with the network for a first time the comparison determines a confidence factor identifying that the device is associated with the user and automatically associate the device with the subscription when the confidence factor exceeds a predefined threshold value access the connection statistics for a first computing device determine, based on the accessed connection statistics for the first computing device, that a second computing device is associated with the user automatically associate the second computing device with the subscription based on the determination the second computing device is automatically associated by connecting with the network providing services offered by the entity the first computing device or the second computing device is automatically associated with another network providing the services offered by the entity, wherein a first location of the other network is different from a second location of the network the network is one of a plurality of networks associated with the entity for which connection statistics are accessed and the other network is one of the plurality of networks associated with the entity to which the first computing device or the second computing device is connecting for a first time wherein the accessed connection statistics include at least a frequency and duration of the connections of the first computing device with the network notifying the second computing device of availability of the services offered by the entity in response to receiving an acceptance of the notification, providing the services offered by the entity to the second computing device by automatically associating the second computing device with the subscription the processor is associated with the first computing device, or a computing device associated with the entity or a third party associated with the entity the monitoring component monitors connections between one or more devices and one or more of a plurality of networks associated with a service provider the statistics component generates the connection statistics based on the monitoring of the connections by the monitoring component the affiliation component infers, based on the generated statistics, that the devices are associated with a subscription of a user to access the networks associated with the service provider the association component automatically associates, based on the inference, the devices with at least one of the plurality of networks associated with the service provider the notification component notifies the devices of content targeted for the user, wherein the targeted content includes at least one of an application, push ads, or push certificates the affiliation component adds the networks to a watch list, and the association component automatically associates the devices with the networks in the watch list.

At least a portion of the functionality of the various elements in FIGS. 3-6 may be performed by other elements in FIG. 2, or an entity (e.g., processor, web service, server, application program, computing device, etc.) not shown in FIG. 2.

In some examples, the operations illustrated in FIGS. 3-6 may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

While the aspects of the disclosure have been described in terms of various examples with their associated operations, a person skilled in the art would appreciate that a combination of operations from any number of different examples is also within scope of the aspects of the disclosure.

The term "roaming" as used herein refers, in some examples, to connectivity provided outside a subscriber's home zone that may be subject to additional tariffs, fees, or constraints. Roaming service may or may not be provided by the same mobile operator. The term "tethered" as used herein refers, in some examples, to situations where one device acts as an access point for another device for network access. A tethered connection may occur over a wired connection or a wireless connection. The term "Wi-Fi" as used herein refers, in some examples, to a wireless local area network using high frequency radio signals for the transmission of data. The term "BLUETOOTH" as used herein refers, in some examples, to a wireless technology standard for exchanging data over short distances using short wavelength radio transmission. The term "cellular" as used herein refers, in some examples, to a wireless communication system using short-range radio stations that, when joined together, enable the transmission of data over a wide geographic area. The term "NFC" as used herein refers, in some examples, to a short-range high frequency wireless communication technology for the exchange of data over short distances.

While no personally identifiable information is tracked by aspects of the disclosure, examples have been described with reference to data monitored and/or collected from the users. In some examples, notice may be provided to the users of the collection of the data (e.g., via a dialog box or preference setting) and users are given the opportunity to give or deny consent for the monitoring and/or collection. The consent may take the form of opt-in consent or opt-out consent.

Exemplary Operating Environment

Exemplary computer readable media include flash memory drives, digital versatile discs (DVDs), compact discs (CDs), floppy disks, and tape cassettes. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Computer storage media are implemented in hardware and exclude carrier waves and propagated signals. Computer storage media for purposes of this disclosure are not signals per se. Exemplary computer storage media include hard disks, flash drives, and other solid-state memory. In contrast, communication media typically embody computer readable instructions, data structures, program modules, or other data in a modulated data signal such as a carrier wave or other transport mechanism and include any information delivery media.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the invention include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like. Such systems or devices may accept input from the user in any way, including from input devices such as a keyboard or pointing device, via gesture input, and/or via voice input.

Examples of the invention may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the figures and described herein. Other examples of the invention may include different computer-executable instructions or components having more or less functionality than illustrated and described herein.

Aspects of the invention transform a general-purpose computer into a special-purpose computing device when configured to execute the instructions described herein.

The examples illustrated and described herein as well as examples not specifically described herein but within the scope of aspects of the invention constitute exemplary means for automatically associating the computing device 202 of the user with the networks of entities to which the user has subscribed. For example, the elements illustrated in FIG. 1, FIG. 2, and/or FIG. 7, such as when encoded to perform the operations illustrated in FIG. 3, FIG. 4, FIG. 5, FIG. 6, and/or FIG. 7, constitute exemplary means for accessing, by the processor 204, the connection statistics for a first computing device associated with the user, exemplary means for determining, based on the accessed connection statistics for the first computing device, that a second computing device is associated with the user, and exemplary means for automatically associating the second computing device with the subscription based on the determination.

The order of execution or performance of the operations in examples of the invention illustrated and described herein is not essential, unless otherwise specified. That is, the operations may be performed in any order, unless otherwise specified, and examples of the invention may include additional or fewer operations than those disclosed herein. For example, it is contemplated that executing or performing a particular operation before, contemporaneously with, or after another operation is within the scope of aspects of the invention.

When introducing elements of aspects of the invention or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A system comprising:
    a memory area associated with a computing device, said memory area storing one or more criteria for associating one or more devices, associated with a user, with a subscription between the user and an internet service provider, the subscription being related to a plurality of services offered by the internet service provider; and
    a processor programmed to:
        monitor, over time, connections between a first device of the one or more of the devices and a first service provided over a network to generate connection statistics being frequency and duration of connection to the first service associated with the internet service provider;
        determine that the frequency and the duration of the connection between the first device and the first service exceed a threshold to the criteria stored in the memory area;
        based on determining that the frequency and the duration of the connection between the first device and the first service exceed the threshold to the criteria, enabling a second device of the at least one of the one or more devices to access, for a first time, one of the plurality of services offered by the internet service provider without providing credentials to access the one of the plurality of services; and
        based at least on the associating, providing the at least one of the one or more devices access to the one of the plurality of services.

2. The system of claim 1, wherein the one or more services include a hotspot associated with the internet service provider, and based on determining that the generated connection statistics exceed the threshold to the criteria, enabling the at least one device to access the hotspot without requiring the user to manually associate the device with the internet service provider.

3. The system of claim 1, wherein the processor is further programmed to prompt the user to download a targeted content item.

4. The system of claim 3, wherein the targeted content item includes at least one of an application, push ads, or push certificates.

5. The system of claim 1, wherein the processor is further programmed to determine that the network is a long dwell network for the user.

6. The system of claim 1, wherein the generated connection statistics include calculating a dwell score, wherein the one or more devices are tagged as having a long dwell with the first service when the calculated dwell score exceeds a predefined threshold.

7. The system of claim 1, wherein the processor is further programmed to activate a pre-loaded application on the at least one of the one or more devices, download an application from the internet service provider, or remove an installed application associated with a different internet service provider based on the associating.

8. The system of claim 1, wherein the at least one of the one or more devices connects with a second service for a first time after determining that the generated connection statistics exceed the threshold to the criteria.

9. The system of claim 1, wherein the processor is programmed to automatically associate the at least one of the one or more devices with the subscription when a confidence factor exceeds a predefined threshold value.

10. A method comprising:
accessing, by a processor, connection statistics being frequency and duration of connection to a first service of a plurality of services associated with the internet service provider for a first computing device associated with a user, the connection statistics representing connections of the first computing device with a network providing the first service, the user having a subscription to the plurality of services offered by the internet service provider;
determining that the frequency and the duration of the connection between the first computing device and the first service exceed a threshold criteria; and
based on determining frequency and the duration of the connection between the first computing device and the first service exceed the threshold criteria enabling the first a second computing device to access, for a first time, one of the plurality of services offered by the internet service provider without providing credentials to access the one of the plurality of services.

11. The method of claim 10, wherein a second computing device associated with the user is associated with the first computing device and is enabled to access each of the plurality of services offered by the internet service provider without providing credentials to access the plurality of services.

12. The method of claim 10, wherein a first location of the first service is different from a second location of a second service from the plurality of services.

13. The method of claim 12, wherein the first computing device connects to the second service for a first time after the first computing device is enabled to access each of the plurality of services offered by the internet service provider without providing credentials to access the plurality of services.

14. The method of claim 10, wherein the accessed connection statistics further include at least a frequency and duration of the connections of the first computing device with the network.

15. The method of claim 11, further comprising:
notifying, the second computing device, of availability of the one or more services offered by the internet service provider; and
in response to receiving an acceptance of the notification, providing the one or more services offered by the internet service provider to the second computing device.

16. The method of claim 10, wherein the processor is associated with the first computing device or a computing device associated with the internet service provider or a third party associated with the internet service provider.

17. One or more computer storage media storing computer executable components, said components comprising:
a monitoring component that when executed by at least one processor causes the at least one processor to monitor connections between a first device of the one or more devices and a plurality of services associated with an internet service provider;
a statistics component that when executed by at least one processor causes the at least one processor to generate connection statistics being frequency and duration of connection to a first service of the plurality of services associated with the internet service provider based on the monitoring of the connections by the monitoring component;
an affiliation component that when executed by at least one processor causes the at least one processor to infer, based on the frequency and the duration of the connection between the first device and the first service, that the first device is associated with a subscription of a user to access the plurality of services associated with the internet service provider; and
an association component that when executed by at least one processor causes the at least one processor to automatically associate, based on the inference, the first device with each of the plurality of services associated with the internet service provider, and based on the association, enabling a second device to access, for a first time, one of the plurality of services offered by the internet service provider without providing credentials to access the one of the plurality of services.

18. The computer storage media of claim 17, further comprising a notification component that when executed by at least one processor causes the at least one processor to notify the one or more devices of content targeted for the user, wherein the targeted content includes an application, push ads, and push certificates.

19. The computer storage media of claim 17, wherein the first device connects with a second service of the plurality of services for a first time after the first device is enabled to access each of the plurality of services offered by the internet service provider without the first device providing credentials to access the second service.

20. The computer storage media of claim 17, wherein the affiliation component adds the plurality of services to a watch list, wherein the association component automatically associates the one or more devices with the plurality of services in the watch list.

* * * * *